(12) United States Patent
Ohshita et al.

(10) Patent No.: US 8,952,667 B2
(45) Date of Patent: Feb. 10, 2015

(54) SWITCHING POWER SUPPLY CIRCUIT

(75) Inventors: Kazuhiro Ohshita, Shiga (JP); Toshio Yabuki, Shiga (JP); Norio Sakae, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 234 days.

(21) Appl. No.: 13/498,596

(22) PCT Filed: Oct. 29, 2010

(86) PCT No.: PCT/JP2010/069305
§ 371 (c)(1),
(2), (4) Date: Mar. 28, 2012

(87) PCT Pub. No.: WO2011/058892
PCT Pub. Date: May 19, 2011

(65) Prior Publication Data
US 2012/0187929 A1 Jul. 26, 2012

(30) Foreign Application Priority Data
Nov. 12, 2009 (JP) .................................. 2009-258565

(51) Int. Cl.
*H02M 3/158* (2006.01)

(52) U.S. Cl.
CPC .... *H02M 3/1584* (2013.01); *H02M 2003/1586* (2013.01)
USPC .............................. 323/272; 323/207; 363/72

(58) Field of Classification Search
CPC .............................. H02M 3/15; H02M 3/1584
USPC .............................. 323/222, 207, 272; 363/72
See application file for complete search history.

(56) References Cited

U.S. PATENT DOCUMENTS

| | | | |
|---|---|---|---|
| 2006/0103359 A1 | 5/2006 | Watanabe et al. | |
| 2008/0049475 A1 | 2/2008 | Watanabe et al. | |

FOREIGN PATENT DOCUMENTS

| | | |
|---|---|---|
| JP | 2006-223025 A | 8/2006 |
| JP | 2007-195282 A | 8/2007 |
| JP | 2007-252177 A | 9/2007 |
| JP | 2008-193818 A | 8/2008 |

OTHER PUBLICATIONS

Kitamura, "1.5kW no Tei-noise Ko-choha Taisaku Dengen o Tsukureru Rinkai Mode/Interleave PFC IC R2A20112", Transistor Gijutsu, CQ Publishing Co., Ltd., May 2008, pp. 176-184.

*Primary Examiner* — Harry Behm
*Assistant Examiner* — Matthew Grubb
(74) *Attorney, Agent, or Firm* — Birch, Stewart, Kolasch & Birch, LLP

(57) ABSTRACT

A master transistor and a slave transistor are both insulated gate bipolar transistors. A slave diode is connected in antiparallel to the slave transistor. The master transistor is brought into conduction if a current flowing in a master reactor becomes zero, and is brought into nonconduction after elapse of a first period. The slave transistor is brought into conduction subject to elapse of a certain period after the master transistor is brought into conduction that is one of conditions for conduction of the slave transistor, and is brought into nonconduction after elapse of a second period shorter than the first period. The certain period is shorter than a period from when the master transistor is brought into conduction until when the master transistor is brought into conduction again.

9 Claims, 7 Drawing Sheets

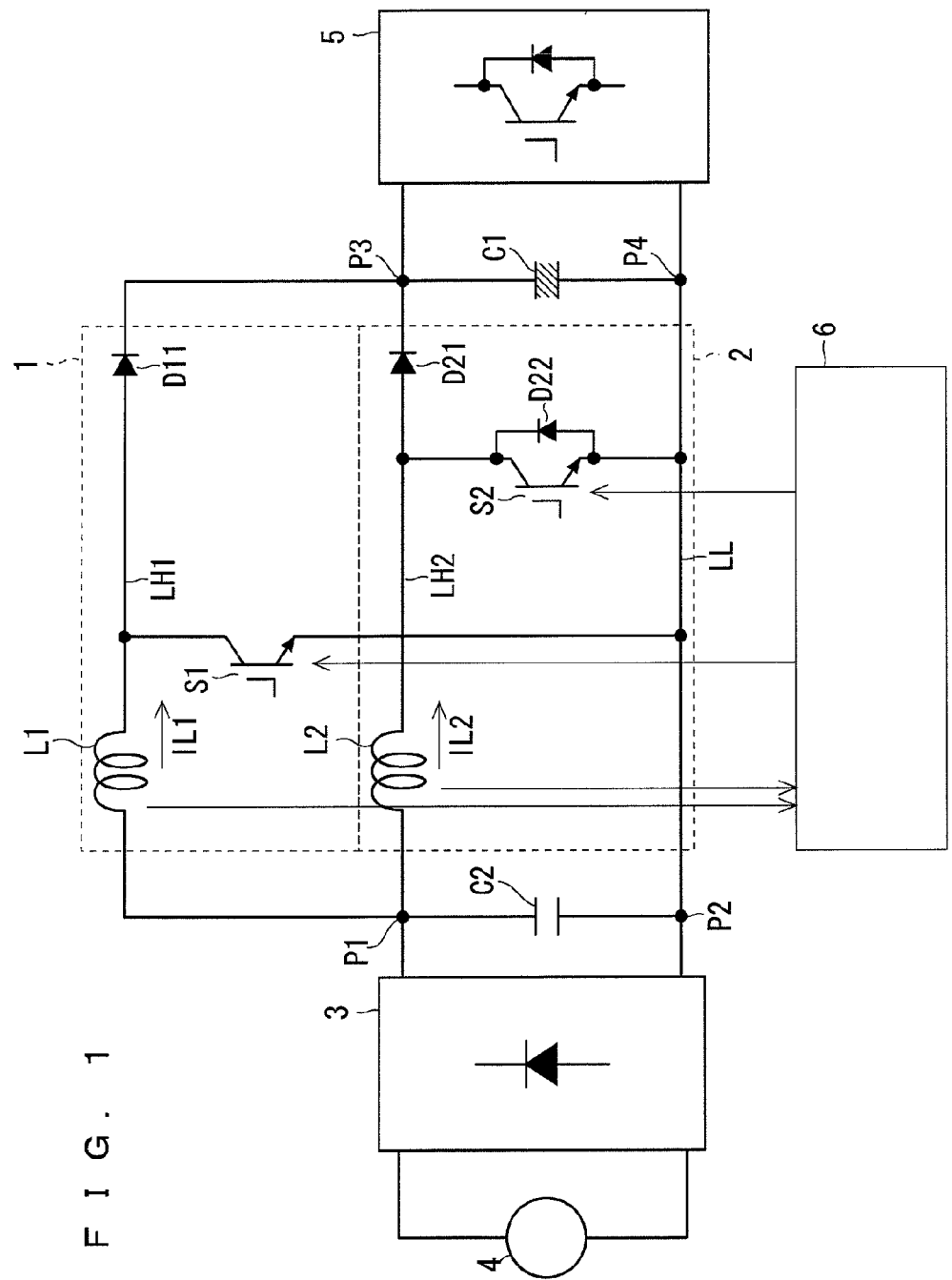
F I G. 1

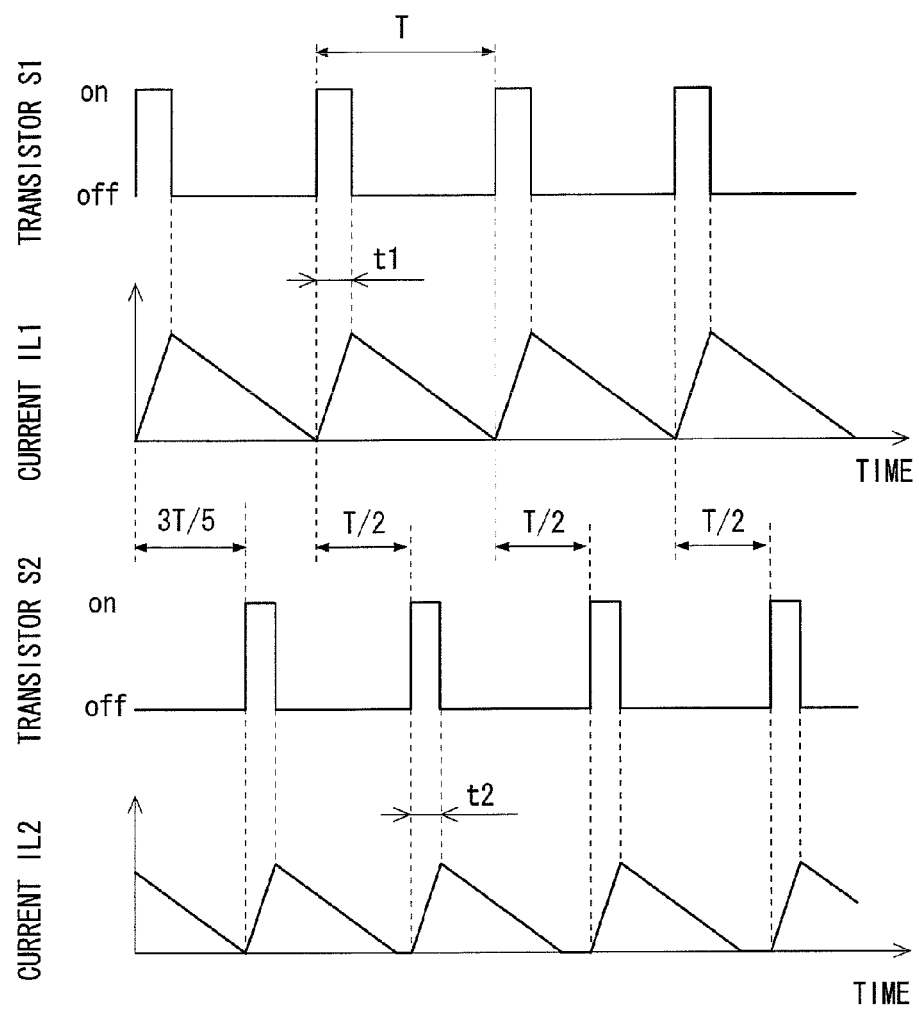
F I G . 4

F I G. 5
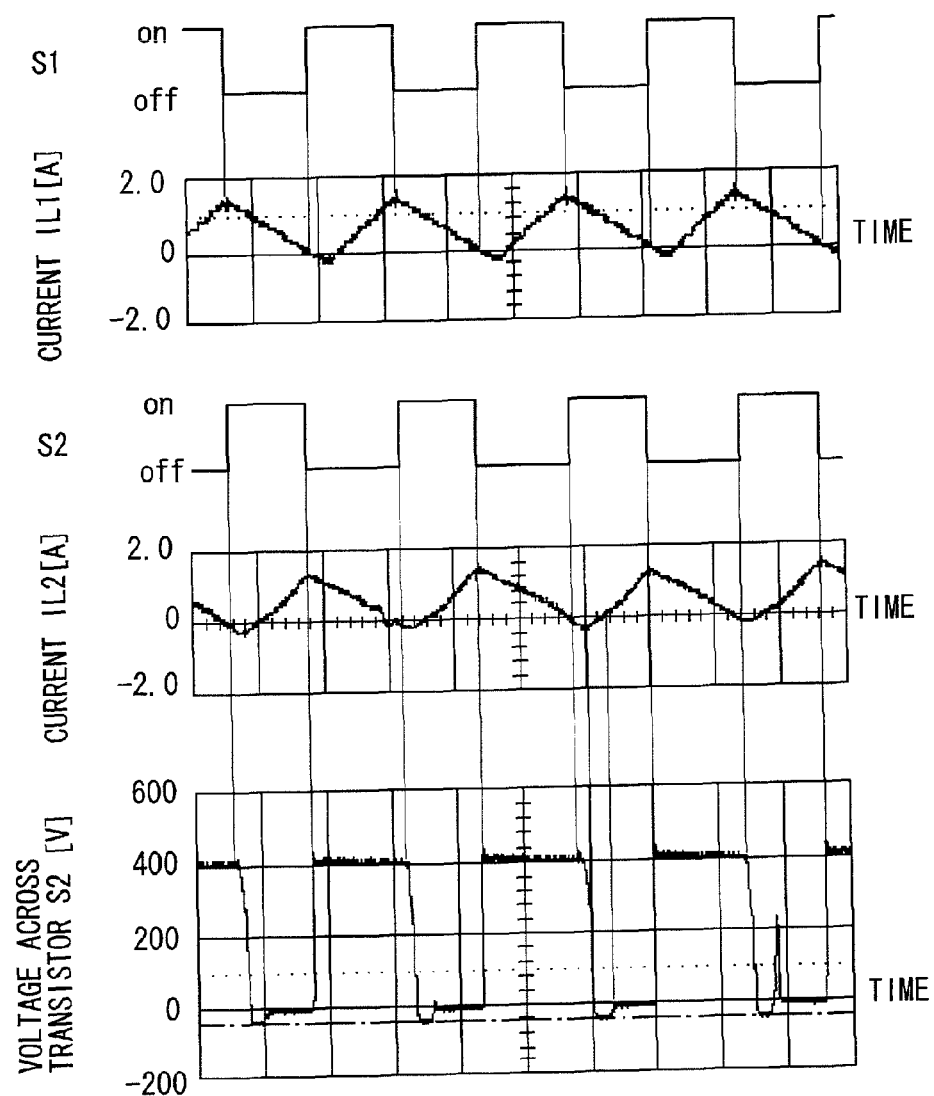

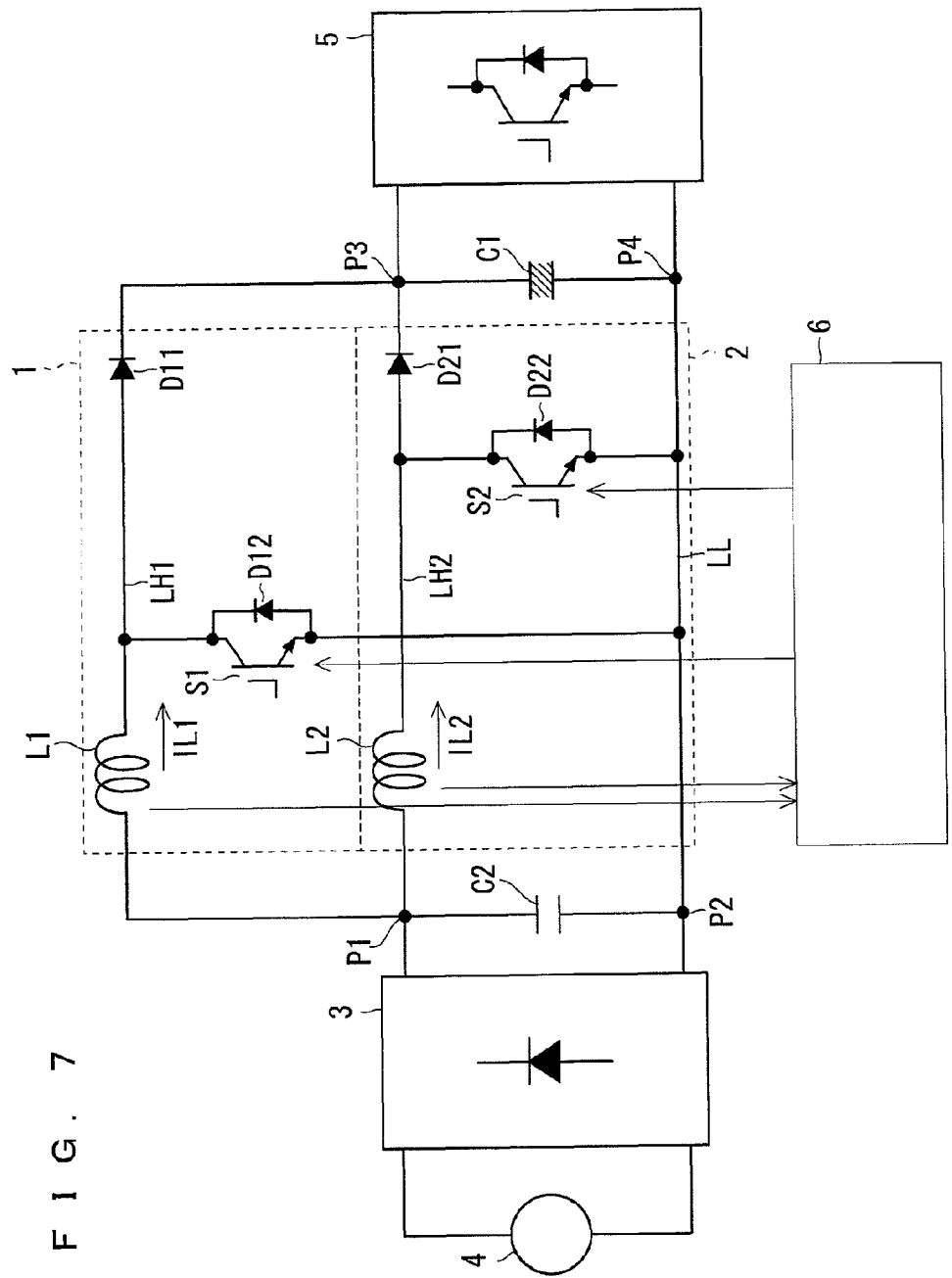
F I G. 7

SWITCHING POWER SUPPLY CIRCUIT

TECHNICAL FIELD

The present invention relates to a switching power supply circuit, and more specifically, to a power factor correction circuit.

BACKGROUND ART

"Critical mode/interleaved PFC IC R2A20112 capable of forming low-noise anti-harmonic power supply of 1.5 kW" by Mamoru Kitamura, in the May 2008 issue of Transistor Technology, pp. 176-184, published by CQ Publishing Co., Ltd. in August, 2008 discloses a power factor correction circuit. The power factor correction circuit includes a master power factor correction circuit and a slave power factor correction circuit. The master and slave power factor correction circuits are connected to the same DC power supply, and are connected in parallel to each other. The master and slave power factor correction circuits have the same structure.

The master and slave power factor correction circuits are what are called booster chopper circuits, and each include a reactor, a diode, and a switching element. A MOS field-effect transistor is used as this switching element.

The switching element of the slave power factor correction circuit is brought into conduction when a predetermined period has elapsed after the switching element of the master power factor correction circuit is brought into conduction. So, these power factor correction circuits operate in what is called an interleaved manner.

Japanese Patent Application Laid-Open No. 2008-193818 and Japanese Patent Application Laid-Open No. 2007-252177 disclose techniques relating to the present invention.

SUMMARY OF THE INVENTION

Problems to be Solved by the Invention

However, since a MOS field-effect transistor is used as a switching element in, "Critical mode/interleaved PFC IC R2A20112 capable of forming low-noise anti-harmonic power supply of 1.5 kW" by Mamoru Kitamura, in the May 2008 issue of Transistor Technology, pp. 176-184, published by CQ Publishing Co., Ltd. in August, 2008, the power factor correction circuit of "Critical mode/interleaved PFC IC R2A20112 capable of forming low-noise anti-harmonic power supply of 1.5 kW" by Mamoru Kitamura, in the May 2008 issue of Transistor Technology, pp. 176-184, published by CQ Publishing Co., Ltd. in August, 2008 is not suitable for large-current purposes.

It is considered that the power factor correction circuit of "Critical mode/interleaved PFC IC R2A20112 capable of forming low-noise anti-harmonic power supply of 1.5 kW" by Mamoru Kitamura, in the May 2008 issue of Transistor Technology, pp. 176-184, published by CQ Publishing Co., Ltd. in August, 2008 can be applied for high-current purposes by using an insulated gate bipolar transistor such as that introduced in Japanese Patent Application Laid-Open No. 2007-252177 as a switching element. Applying the power factor correction circuit of "Critical mode/interleaved PFC IC R2A20112 capable of forming low-noise anti-harmonic power supply of 1.5 kW" by Mamoru Kitamura, in the May 2008 issue of Transistor Technology, pp. 176-184, published by CQ Publishing Co., Ltd. in August, 2008 for large-current purposes leads to increase of conduction loss generated in each constituent element. In response, a diode having a low forward drop voltage is used in a switching power supply circuit, for example. A trade-off relationship between the forward drop voltage and the reverse recovery characteristics of a diode may result in flow of a reverse recovery current in the diode. So, a reverse voltage may be applied to a switching element due to such a reverse recovery current.

It is therefore an object of the present invention to provide a power factor correction circuit for eliminating or reducing a reverse voltage to be applied to a switching element used in a switching power supply circuit.

Means for Solving Problems

According to a first aspect of a switching power supply circuit of the present invention, the switching power supply circuit includes: a low power supply line (LL); a master power supply line (LH1) and a slave power supply line (LH2) to each of which a potential higher than that applied to the low power supply line is applied; a master reactor (L1) and a slave reactor (L2) provided in the master power supply line and the slave power supply line respectively, the master and slave reactors having the same inductance; a first master diode (D11) and a first slave diode (D21) connected in series to the master reactor and to the slave reactor in the master power supply line and the slave power supply line respectively, the first master diode and the first slave diode having anodes pointing to the master reactor and the slave reactor respectively; a master insulated gate bipolar transistor (S1) provided between a node between the master reactor and the master diode, and the low power supply line, the master insulated gate bipolar transistor having an emitter pointing to the low power supply line, the master insulated gate bipolar transistor being brought into conduction if a current flowing in the master reactor becomes zero, the master insulated gate bipolar transistor being brought into nonconduction after elapse of a first period (t1); a slave insulated gate bipolar transistor (S2) provided between a node between the slave reactor and the slave diode, and the low power supply line, the slave insulated gate bipolar transistor having an emitter pointing to the low power supply line, the slave insulated gate bipolar transistor being brought into conduction subject to elapse of a certain period after the master transistor is brought into conduction that is one of conditions for conduction of the slave insulated gate bipolar transistor, the certain period being shorter than a period from when the master insulated gate bipolar transistor is brought into conduction until when the master insulated gate bipolar transistor is brought into conduction again, the slave insulated gate bipolar transistor being brought into nonconduction after elapse of a second period (t2) shorter than the first period (t1); and a second slave diode (D22) connected in parallel to the slave insulated gate bipolar transistor (S2), the second slave diode having an anode pointing to the low power supply line.

According to a second aspect of the switching power supply circuit of the present invention, the switching power supply circuit of the first aspect further includes a second master diode (D12) connected in parallel to the master insulated gate bipolar transistor (S1). The second master diode has a cathode pointing to the master power supply line (LH1).

According to a third aspect of the switching power supply circuit of the present invention, the switching power supply circuit of the first or second aspect further includes a capacitor (C2) having a capacitance of 0.5 µF or higher than 0.5 µF. The capacitor has one end connected to the low power supply line (LL), and the other end connected to the master power supply line (LH1) on the side opposite the first master diode (D11) with respect to the master reactor (L1). The other end is also connected to the slave power supply line (LH2) on the side opposite the first slave diode (D21) with respect to the slave reactor (L2).

According to a fourth aspect of the switching power supply circuit of the present invention, in the switching power supply circuit of any one of the first to third aspects, the slave insulated gate bipolar transistor (S2) is brought into conduction subject to satisfaction of both the aforementioned condition, and a second condition that is satisfied if a current flowing in the slave reactor (L2) becomes zero.

Advantageous Effects of the Invention

The first aspect of the switching power supply circuit of the present invention is capable of making the switching power supply circuit function as an interleaved power factor correction circuit (PFC) operating in a current critical mode (mode in which an insulated gate bipolar transistor is brought into conduction after a current flowing in a reactor becomes zero).

Further, use of an insulated gate bipolar transistor makes it possible to respond to a high current.

Additionally, the second period is shorter than the first period. Further, the same inductance of the master and slave reactors makes the maximum value of a current flowing in the slave reactor lower than the maximum value of a current flowing in the master reactor. As a result, a period from when the slave insulated gate bipolar transistor (hereinafter called the slave IGBT) is brought into nonconduction until when the current flowing in the slave reactor becomes zero is made shorter than a period from when the master insulated gate bipolar transistor (hereinafter called the master IGBT) is brought into nonconduction until when the current flowing in the master reactor becomes zero (see FIG. 4).

After the currents flowing in the master and slave reactors become zero, reverse recovery currents in the first master diode and the first slave diode flow into the master and slave reactors respectively. The slave IGBT is brought into conduction after the slave reactor becomes zero. So, the slave IGBT is brought into conduction while the reverse recovery current from the slave diode flows in the slave reactor. Meanwhile, the master IGBT is brought into conduction if the slave reactor becomes zero. So, the peak of the reverse recovery current flowing in the slave reactor is higher than the peak of the reverse recovery current flowing in the master reactor. Regarding a period from when the absolute value of a reverse recovery current drops until when the reverse recovery current becomes zero, this period is longer in the slave reactor accordingly. Thus, the slave IGBT may be subjected to application of a reverse voltage longer than the master IGBT. However, application of this reverse voltage can be avoided by the presence of the second slave diode connected in parallel to the slave IGBT.

The second aspect of the switching power supply circuit of the present invention is capable of avoiding even a reverse voltage to be applied to the master insulated gate bipolar transistor.

The third aspect of the switching power supply circuit of the present invention is capable of reducing a current generated by charge or discharge of a parasitic capacitance existing in each part as a result of switch of the master insulated gate bipolar transistor between conduction and nonconduction.

According to the fourth aspect of the switching power supply circuit of the present invention, even if instantaneous increase of a voltage makes the slave reactor become zero after a point in time when the certain period has elapsed after the master IGBT is brought into conduction, so if the slave IGBT is brought into conduction after a point in time when the certain period has elapsed after the master IGBT is brought into conduction, a period between when the master IGBT is brought into conduction and when the slave IGBT is brought into conduction can become the certain period again by bringing the master and slave IGBTs into conduction or nonconduction repeatedly.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a view showing an example of a conceptual structure of a switching power supply circuit;

FIGS. 2 through 6 are views each showing a conceptual example of a timing chart; and FIG. 7 is a view showing an example of a conceptual structure of a switching power supply circuit.

EMBODIMENT(S) FOR CARRYING OUT THE INVENTION

Embodiment

<Structure>

Figure 2:
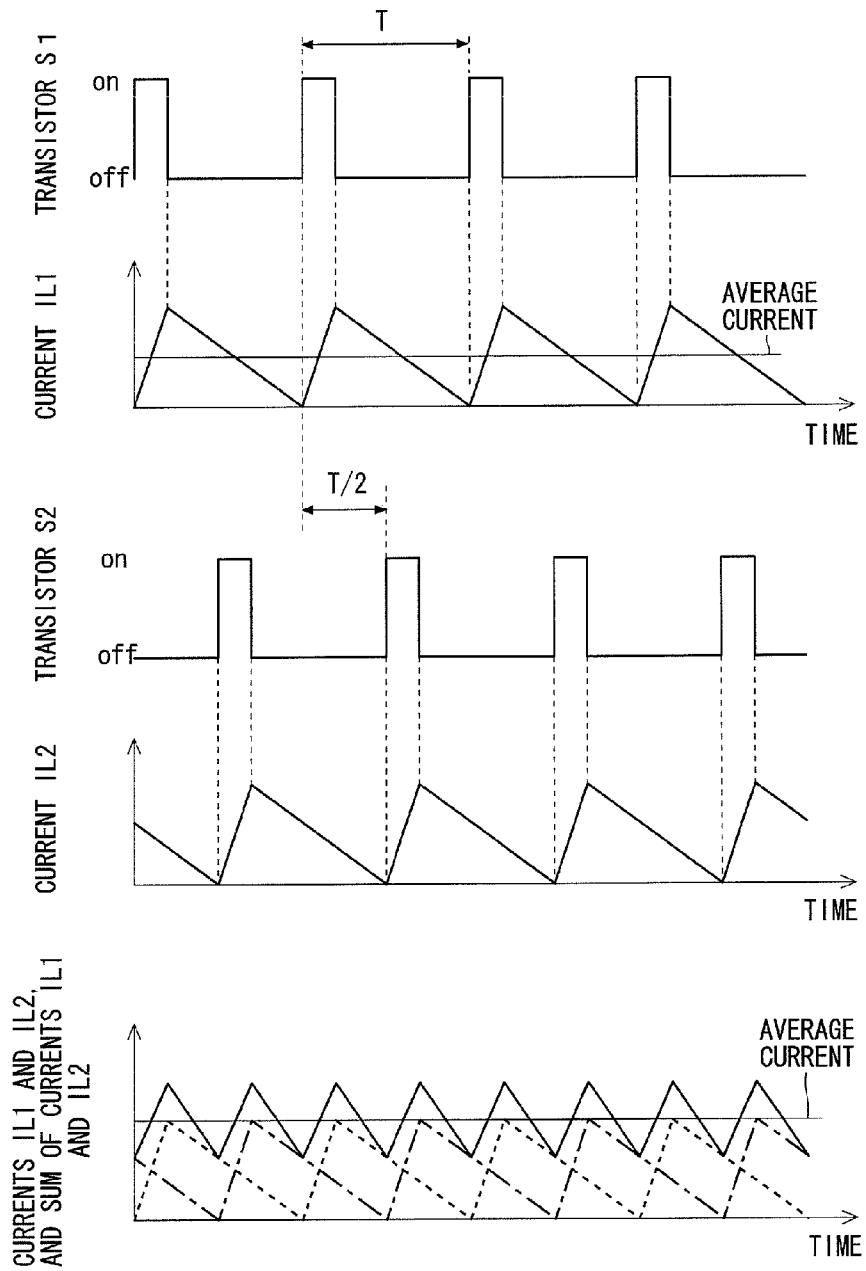

As shown in the example of FIG. 1, the present switching power supply circuit includes a master circuit 1, a slave circuit 2, input ends P1 and P2, output ends P3 and P4, and a power supply line LL. The power supply line LL connects the input and output ends P2 and P4.

A DC voltage is applied between the input ends P1 and P2. In the example of FIG. 1, a diode rectifying circuit 3 is connected to the input ends P1 and P2. The diode rectifying circuit 3 rectifies an AC voltage from an AC power supply 4, and applies a DC voltage obtained after the rectification between the input ends P1 and P2. Here, a potential applied to the input end P2 is lower than a potential applied to the input end P1. Connection of the diode rectifying circuit 3 to the input ends P1 and P2 is not an absolute necessity. Any structure for applying a DC voltage between the input ends P1 and P2 may be connected to the input ends P1 and P2.

A capacitor C2 may be provided between the input ends P1 and P2. The capacitor C2 can reduce current noise.

The master circuit 1 includes a master power supply line LH1, a master reactor L1, a master diode D11, and a master insulated gate bipolar transistor (hereinafter called a master transistor) S1.

The master power supply line LH1 connects the input end P1 and the output end P3. The master reactor L1 and the master diode D11 are provided in the master power supply line LH1. The master diode D11 is placed on the side opposite the input end P1 with respect to the master reactor L1, and is connected in series to the master reactor L1. The master diode D11 has an anode pointing to the master reactor L1.

The master transistor S1 is provided between a node between the master reactor L1 and the master diode D11, and the power supply line LL. The master transistor S1 has a collector terminal pointing to the master power supply line LH1, and an emitter terminal pointing to the power supply line LL. The master transistor S1 is brought into conduction in response to a switching signal received at the gate terminal thereof from a controller 6.

The slave circuit 2 includes a slave power supply line LH2, a slave reactor L2, slave diodes D21 and D22, and a slave insulated gate bipolar transistor (hereinafter called a slave transistor) S2.

The slave power supply line LH2 connects the input and output ends P1 and P3. The slave reactor L2 and the slave diode D21 are provided in the slave power supply line LH2. The inductance of the slave reactor L2 is the same as that of the master reactor L1. The slave diode D21 is placed on the side opposite the input end P1 with respect to the slave reactor L2, and is connected in series to the slave reactor L2. The slave diode D21 has an anode pointing to the slave reactor L2.

The slave transistor S2 is provided between a node between the slave reactor L2 and the slave diode D21, and the power supply line LL. The slave transistor S2 has a collector terminal pointing to the slave power supply line LH2, and an emitter terminal pointing to the power supply line LL. The slave transistor S2 is brought into conduction in response to a switching signal received at the gate terminal thereof from the controller 6. The slave diode D22 has an anode pointing to the power supply line LL, and is connected in parallel to the slave transistor S2.

A smoothing capacitor C1 is provided between the output ends P3 and P4.

The controller 6 detects a current IL1 flowing in the master reactor L1, and brings the master transistor S1 into conduction based on the current IL1. The controller 6 brings the slave transistor S2 into conduction subject to elapse of a predetermined period after the master transistor S1 is brought into conduction that is one of conditions for conduction of the slave transistor S2. The controller 6 may detect a current IL2 flowing in the slave reactor L2, and bring the slave transistor S2 into conduction if the aforementioned one of the conditions and a condition based on the current IL2 are satisfied. The conduction in these ways is described in detail later. The currents IL1 and IL2 can be detected by using a method in which each of the reactors L1 and L2 functions a transformer as disclosed in each of the literatures listed in citation list. An actor of control of the master and slave transistors S1 and S2 described below is the controller 6 unless specifically described otherwise.

The controller 6 is composed of a microcomputer and a storage device. The microcomputer executes process steps (in other words, procedures) described in a program. The storage device can be composed of one, or a plurality of storage devices including a ROM (read-only memory), a RAM (random-access memory), a rewritable nonvolatile memory (such as an EPROM (erasable programmable ROM)), and a hard disk drive, for example. The storage device stores information and data of various types, stores a program to be executed by the microcomputer, and provides a work area used for execution of the program. The microcomputer can be understood as functioning as various means corresponding to the process steps described in the program, or understood as realizing various functions corresponding to the process steps. The controller 6 is not limited to the foregoing, but part of or all of various procedures to be executed by the controller 6, or various means or various functions to be realized by the controller 6 may be realized in terms of hardware.

The master and slave circuits 1 and 2 have the insulated gate bipolar transistors S1 and S2 respectively, so that the present switching power supply is applied more suitably for large-current purposes than a MOS field-effect transistor. If the present switching power supply circuit is applied for large-current purposes, it is desirable that diodes having low forward drop voltages be used as the master and slave diodes D11 and D21. The reason therefor is that conduction losses of the master and slave diodes D11 and D21 increase as the magnitude of a current increases. Meanwhile, such master and slave diodes D11 and D21 do not have excellent reverse recovery characteristics, causing reverse recovery currents to flow easily in the master and slave diodes D11 and D21. Here, the master and slave diodes D11 and D21 have the same reverse recovery characteristics.

In the example of FIG. 1, an inverter 5 is connected to the output ends P3 and P4. However, the inverter 5 is not necessarily required to be connected to the output ends P3 and P4, but an arbitrarily determined different load may be connected to the output ends P3 and P4.

<Operation>

The outline of the operation of the present switching power supply circuit is described first by referring to FIGS. 1 and 2. In the description given below and drawings, a direction in which the currents IL1 and IL2 flow from the diode rectifying circuit 3 toward the inverter 5 is assumed to be a positive direction.

If the master transistor S1 is conducting in the master circuit 1, a current flows from the input end P1 toward the input end P2 by passing through the master reactor L1 and the master transistor S1. This current increases according to an inclination determined by the inductance of the master reactor L1 and a DC voltage applied between the input ends P1 and P2 (see the current IL1 of FIG. 2). This current stores electromagnetic energy in the reactor L1.

In response to switch of the master transistor S1 from conduction to nonconduction, a current flows from the input end P1 toward the input end P2 by passing through the master reactor L1, the master diode D11, and the smoothing capacitor C1. At this time, a voltage (induced electromotive voltage) generated by the electromagnetic energy stored in the reactor L1 is added to the DC voltage between the input ends P1 and P2, and a sum of the voltages is applied to the smoothing capacitor C1. This allows the master circuit 1 to boost the DC voltage between the input ends P1 and P2, and to apply the boosted voltage to the smoothing capacitor C1.

The aforementioned current decreases with an inclination determined based on the inductance of the master reactor L1, the capacitance of the smoothing capacitor C1 and the like (see the current IL1 of FIG. 2). If this current, namely the current IL1 becomes zero, the master transistor S1 is brought into conduction again. The aforementioned operation is thereafter repeated. This operation changes the current IL1 in the shape of saw teeth. A mode in which the master transistor S1 is brought into conduction after the current IL1 flowing in the master reactor L1 becomes zero is what is called a critical current mode.

As described above, the master circuit 1 is capable of functioning as a switching power supply circuit that boosts a voltage between the input ends P1 and P2, and applies the boosted voltage between the output ends P3 and P4. A current flows into the diode rectifying circuit 3 through the master transistor S1 even in a period when no current flows into the smoothing capacitor C1 (period when the master transistor S1 is conducting). This makes it possible to increase the conduction angle of a current flowing in the diode rectifying circuit 3. In other words, the master circuit 1 is capable of functioning as a power factor correction circuit. Further, use of an insulated gate bipolar transistor as a switching element of the master circuit 1 allows flow of a current larger than that in a structure with a MOS field-effect transistor, for example.

The slave circuit 2 performs the same operation as that of the master circuit 1. However, the slave transistor S2 is brought into conduction subject to elapse of a predetermined period after the master transistor S1 is brought into conduction that is a first condition for conduction of the slave transistor S2. The predetermined period is shorter than a period (hereinafter also called a cycle) T from when the master transistor S1 is brought into conduction until when the master transistor S1 is brought into conduction again. In the example of FIG. 2, a period corresponding to half of the period T is employed as the predetermined period. Described below is a case where half of the period T is adopted as the predetermined period.

By the first condition, the slave circuit 2 performs the same operation as that of the master circuit 1 while lagging a half cycle behind the master circuit 1. So, the current IL2 flowing in the slave reactor L2 lags one half cycle behind the current IL1 flowing in the master reactor L1. As a result, while one of the currents IL1 and IL2 is low, the other one of the currents IL1 and IL2 is high.

If the present switching power supply circuit includes only the master circuit 1, for example, a current flowing in the diode rectifying circuit 3 is the same as the current IL1 flowing in the master reactor L1. In contrast, a current flowing in the diode rectifying circuit 3 of the present switching power supply circuit is the same as a sum of the currents IL1 and IL2. In the present switching power supply circuit, while one of the currents IL1 and IL2 is low, the other one of the currents IL1 and IL2 is high. So, an average of the current flowing in the diode rectifying circuit 3 can be increased without changing the maximum value (peak) of the current (see an average current of the current IL1, and an average current of a sum of the currents IL1 and IL2 shown in FIG. 2). In other words, the peak of the current flowing in the diode rectifying circuit 3 can be reduced while achieving the same average of a current.

The slave transistor S2 may be brought into conduction subject to the first condition, and further subject to a second condition that the current IL2 flowing in the slave reactor L2 becomes zero. This allows the slave circuit 2 to operate more reliably in the critical current mode.

Figure 3:
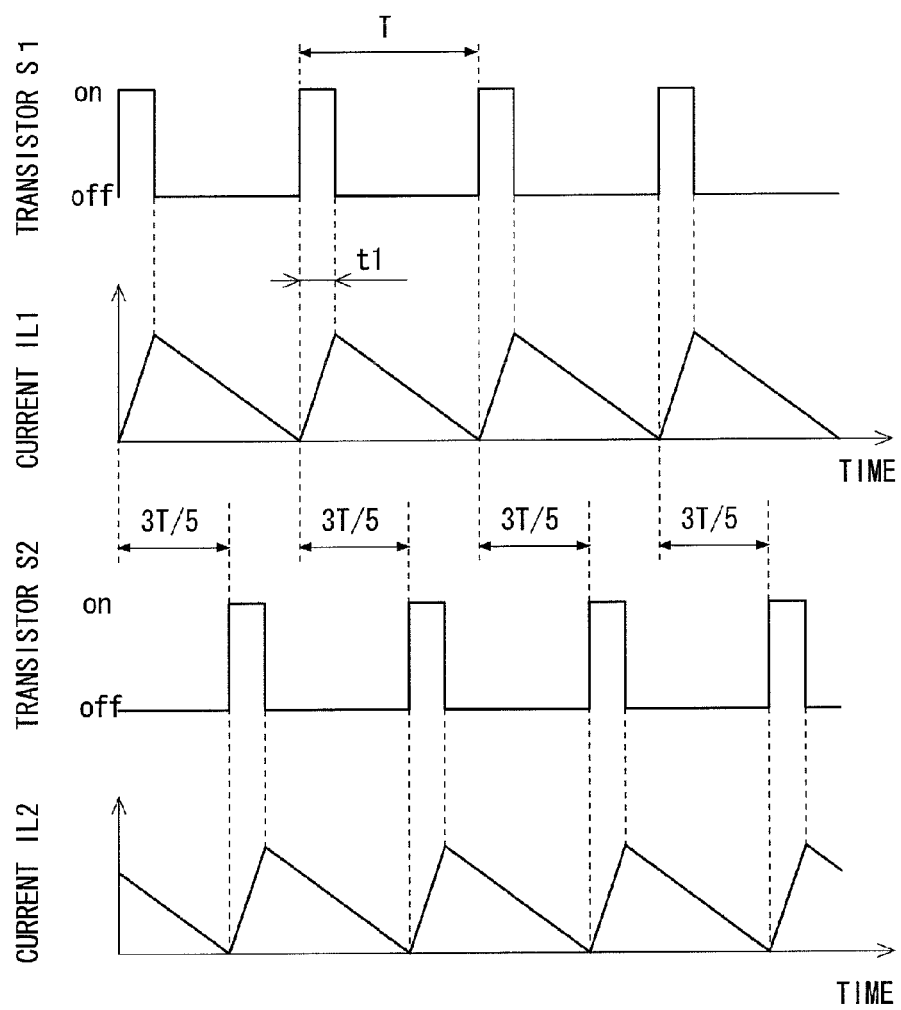

Even if a phase difference between the currents IL1 and IL2 shifts from a value corresponding to the half cycle, for example, the present switching power supply circuit is devised in the following manner in order to make this phase difference become the half cycle again. Shift of the phase difference is described first. By way of example, instantaneous increase of a voltage between the input ends P1 and P2 may delay the current IL2 to make the current IL2 zero. In this case, subject to the second condition, the slave transistor S2 is brought into conduction still after a point in time when the half cycle has elapsed after the master transistor S1 is brought into conduction. In the example of FIG. 3, the slave transistor S2 is brought into conduction when three-fifths of the cycle has elapsed after the master transistor S1 is brought into conduction. The currents IL1 and IL2 thereafter reach zero by following the same cycle, so a phase difference between the currents IL1 and IL2 is kept at a value corresponding to three-fifths of the cycle. As a result, the master and slave transistors S1 and S2 are brought into conduction at points in time shifted from each other by three-fifths of the cycle.

In order to correct the aforementioned shift of the phase difference to the half cycle, a conduction period t2 of the slave transistor S2 is made shorter than a conduction period t1 of the master transistor S1 in the present embodiment. As an example, the conduction period of the master transistor S1 is some microseconds, and the conduction period of the slave transistor S2 is set to be shorter than the conduction period of the master transistor S1 by some hundreds of nanoseconds.

The conduction period t2 is shorter than the conduction period t1, and the master and slave reactors L1 and L2 have substantially the same inductance. So, the peak of the current IL2 is lower than the peak of the current IL1.

So, the current IL2 starts to decrease from a value lower than a corresponding value of the current IL1. Additionally, the substantially same inductance of the master and slave reactors L1 and L2 makes the currents IL1 and IL2 decrease with the substantially same inclination. Thus, a period from when the slave transistor S2 is brought into conduction until when the current IL2 becomes zero is shorter than a period when the master transistor S1 is brought into conduction until when the current IL1 becomes zero (one cycle T). As a result, the current IL2 becomes zero before elapse of one cycle T after the slave transistor S2 is brought into conduction.

So, even if a period between a time when the master transistor S1 is brought into conduction and a time when the slave transistor S2 is brought into conduction is made three-fifths the cycle due to instantaneous increase of a voltage between the input ends P1 and P2, for example, this period can be made to become the half cycle again by bringing the master and slave transistors S1 and S2 into conduction or nonconduction repeatedly as shown in the example of FIG. 4.

A difference between the conduction periods t2 and t1 may be variable. As an example, a difference SUB1 is employed if the current IL2 is already zero when a predetermined period (here, the half cycle) has elapsed after the master transistor S1 is brought into conduction. Further, a difference SUB2 larger than the difference SUB1 is employed if the current IL2 does not become zero when the predetermined period has elapsed after the master transistor S1 is brought into conduction.

So, if a phase difference shifts from a desirable value, the larger difference SUB2 is employed. This shortens a period for the current IL2 to become zero, allowing the phase difference to become the desirable value again early. In contrast, if the phase difference is at the desirable value, the smaller difference SUB1 is employed. This allows increase of the peak of the current IL2, thereby making it possible to increase an average current of a current flowing in the diode rectifying circuit 3.

Although not shown in FIGS. 2 to 4, the actual situation is that, after the currents IL1 and IL2 both become zero, currents from the output terminal P3 toward the input end P1 flow into the master and slave reactors L1 and L2 as a result of the reverse recovery characteristics of the master and slave diodes D11 and D21 respectively. In the example of FIG. 5, such currents IL1 and IL2 are shown as negative currents.

The present control method makes the minimum value of the current IL2 smaller than the minimum value of the current IL1. In the example of FIG. 5, the minimum value of the current IL1 is −0.32 A, and the minimum value of the current IL2 is −0.40 A. Such a magnitude relationship between the minimum values of the currents IL1 and IL2 is considered to result from the reason as follows.

A voltage across the master transistor S1 decreases to become substantially zero if the master transistor S1 is switched from nonconduction to conduction. In response, a large reverse voltage is applied to the master diode D11. This reverse voltage causes more carriers stored inside the master diode D11 to move. A reverse recovery current starts to decrease if there are no movable carriers.

Likewise, a voltage across the slave transistor S2 decreases to become substantially zero if the slave transistor S2 is switched from nonconduction to conduction. In response, a large reverse voltage is applied to the slave diode D21. This reverse voltage causes more carriers stored inside the slave diode D21 to move. A reverse recovery current starts to decrease if there are no movable carriers.

As described above, the currents IL1 and IL2 shift from decrease to increase at points in time that are also determined depending on points in time when the master and slave transistors S1 and S2 are brought into conduction respectively.

When the current IL1 becomes zero, a switching signal is given to the gate terminal of the master transistor S1. After the current IL2 becomes zero, a switching signal is given to the gate terminal of the slave transistor S2. A period from when the current IL2 becomes zero until when the currents IL2 shifts from decrease to increase is longer than a period from when the current IL1 becomes zero until when the currents IL1 shifts from decrease to increase. Thus, the minimum value of the current IL2 is smaller than the minimum value of the current IL1.

An induced electromotive voltage placing the slave diode D21 at a low potential and placing the input end P1 at a high potential is generated in the slave reactor L2 when the current IL2 increases. So, if in the absence of the slave diode D22, a reverse voltage placing the collector terminal at a low potential and placing the emitter terminal at a high potential is applied to the slave transistor S2 in a period during which the current IL2 reaches to zero from its minimum value. A current flows into the slave reactor L2 and the slave transistor S2 while the current IL2 is zero or higher than zero. So, in this case, a reverse voltage is not applied to the slave transistor S2.

A reverse voltage may also be generated in the master transistor S1 in a period during which the current IL1 reaches to zero from at its minimum value. However, the minimum value of the current IL2 smaller than the minimum value of the current IL1. Thus, the period during which the current IL1 reaches to zero form at its minimum value is shorter than the period during which the current IL2 reaches to zero from its minimum value. So, a reverse voltage is applied to the master transistor S1 for a period shorter than that of the slave transistor S2.

Figure 6:
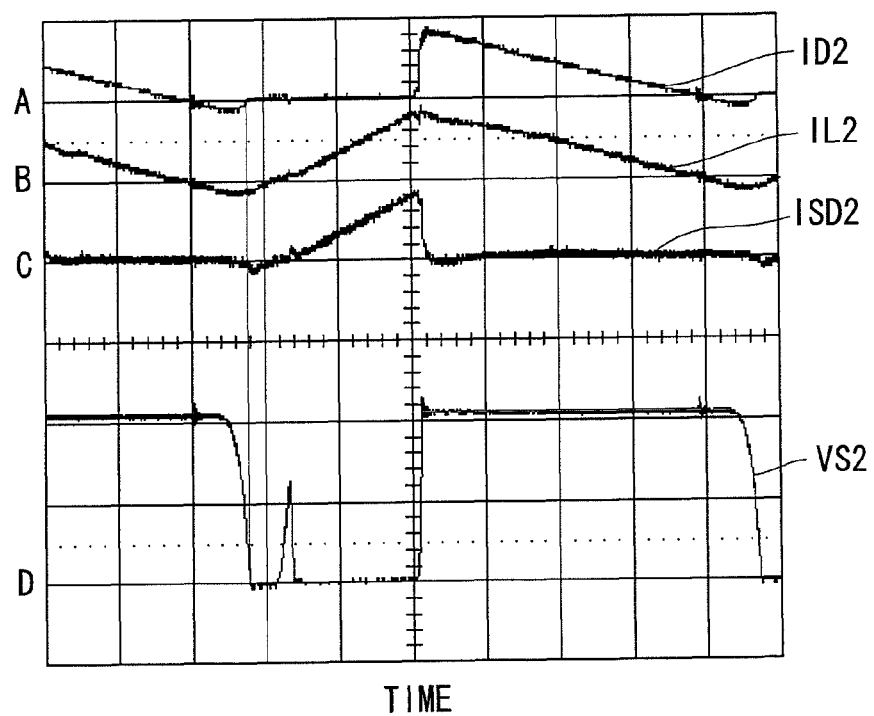

In the present switching power supply circuit, the slave diode D22 is connected in anti-parallel to the slave transistor S2 that may be subjected to application of a reverse voltage for a longer period. FIG. 6 shows an example of a timing chart relating to the present switching power supply circuit.

In FIG. 6, a current ID2 flowing in the slave diode D21, the current IL2, a current ISD2 flowing in the slave transistor S2 and the slave diode D22 as a pair, and a voltage VS2 across the slave transistor S2 are shown in the same coordinate system. In this coordinate system, the height of one clock indicates 5 A if the vertical axis indicates current. If the vertical axis indicates voltage, the height of one block indicates 200 V. Horizontal axes A, B and C placed in this order from the top of the figure show that the current values of the currents ISD2, IL2 and ID2 are zero respectively. A horizontal axis D being a second axis from the bottom of the figure shows that the voltage value of the voltage VS2 is zero. Regarding the current ID2, a direction from the slave reactor L2 toward the output end P3 is assumed to be a positive direction. Regarding the current ISD2, a direction from the slave power supply line LH2 toward the power supply line LL is assumed to be a positive direction.

As shown in the example of FIG. 6, if a reverse voltage can be applied to the slave transistor S2, the current ISD2 flows from the power supply line LL toward the slave power supply line LH2. To be specific, the current ISD2 flows into the slave diode D22, making the voltage VS2 across the slave transistor S2 connected in parallel to the slave diode D22 substantially zero. This prevents application of a reverse voltage to the slave transistor S2.

In order to achieve the effect of making a phase difference become a desirable value again while maintaining the current critical mode more reliably, the slave transistor S2 should be brought into conduction subject to the fact that the current IL2 has become zero that is one of conditions for conduction of the slave transistor S2. However, this is not an absolute necessity as for a reverse voltage to be applied to the slave transistor S2 due to the aforementioned reverse recovery current. In essence, what is required is that the master and slave reactors L1 and L2 have the same inductance, and that the conduction period t2 is shorter than the conduction period t1.

In addition, the master circuit 1 may further include a master diode D12 as shown in FIG. 7. The master diode D12 is connected in parallel to the master transistor S1, while having an anode pointing to the power supply line LL, and a cathode pointing to the master power supply line LH1. The master diode D12 is capable of eliminating even a reverse voltage to be applied to the master transistor S1.

Switch of the master transistor S1 from nonconduction to conduction (turn-on), or from conduction to nonconduction (turn-off) may cause a charging or discharging current to flow due to a parasitic capacitance existing in each part. Such a charging or discharging current flows not only in the master circuit 1 but also in the slave circuit 2. As a result, the operation of the slave circuit 2 may be affected adversely. A charging or discharging current is also caused to flow by the turn-on or turn-off of the slave transistor S2. As a result, the master circuit 1 may be affected adversely. Such a charging or discharging current may also generate a fear of failing to detect the fact that the currents IL1 and IL2 have become zero.

So, it is desirable that the capacitance of the capacitor C2 be 0.5 μF or higher than 0.5 μF. The reason therefor is that this can reduce a charging or discharging current, leading to prevention or suppression of interrelated adverse effect on the master and slave circuits 1 and 2, and failure to detect the fact that the currents IL1 and IL2 have become zero currents.

The present switching power supply circuit includes one master circuit 1 and one slave circuit 2. However, the switching power supply circuit may include a plurality of slave circuits 2. If the switching power supply circuit includes two slave circuits 2, one of the slave circuits 2 operates while lagging a first predetermined period (such as one-third of the cycle) behind the master circuit 1, while the other of the slave circuits 2 operates while lagging a second predetermined period (such as two-thirds of the cycle).

While the invention has been shown and described in detail, the foregoing description is in all aspects illustrative and not restrictive. It is therefore understood that numerous modifications and variations not shown can be devised without departing from the scope of the invention.

The invention claimed is:

1. A switching power supply circuit, comprising:
 a low power supply line;
 a master power supply line and a slave power supply line to each of which a potential higher than that applied to said low power supply line is applied;
 a master reactor and a slave reactor provided in said master power supply line and said slave power supply line respectively, the master and slave reactors having the same inductance;
 a first master diode and a first slave diode connected in series to said master reactor and to said slave reactor in said master power supply line and said slave power supply line respectively, the first master diode and said first slave diode having anodes pointing to said master reactor and said slave reactor respectively;
 a master insulated gate bipolar transistor provided between a node between said master reactor and said master diode, and said low power supply line, the master insulated gate bipolar transistor having an emitter pointing to said low power supply line, the master insulated gate bipolar transistor being brought into conduction if a current flowing in said master reactor becomes zero, the master insulated gate bipolar transistor being brought into nonconduction after elapse of a first period;

a slave insulated gate bipolar transistor provided between a node between said slave reactor and said slave diode, and said low power supply line, the slave insulated gate bipolar transistor having an emitter pointing to said low power supply line, the slave insulated gate bipolar transistor being brought into conduction subject to elapse of a certain period after said master transistor is brought into conduction that is one of conditions for conduction of the slave insulated gate bipolar transistor, the certain period being shorter than a period from when said master insulated gate bipolar transistor is brought into conduction until when said master insulated gate bipolar transistor is brought into conduction again, the slave insulated gate bipolar transistor being brought into non-conduction after elapse of a second period shorter than said first period under normal operating conditions; and a second slave diode connected in parallel to said slave insulated gate bipolar transistor, the second slave diode having an anode pointing to said low power supply line.

2. The switching power supply circuit according to claim 1, further comprising a second master diode connected in parallel to said master insulated gate bipolar transistor, the second master diode having a cathode pointing to said master power supply line.

3. The switching power supply circuit according to claim 2, further comprising a capacitor having a capacitance of 0.5 μF or higher than 0.5 μF, the capacitor having one end connected to said low power supply line, and the other end connected to said master power supply line on the side opposite said first master diode with respect to said master reactor, the other end also being connected to said slave power supply line on the side opposite said first slave diode with respect to said slave reactor.

4. The switching power supply circuit according to claim 3, wherein said slave insulated gate bipolar transistor is brought into conduction subject to satisfaction of both said condition, and a second condition that is satisfied if a current flowing in said slave reactor becomes zero.

5. The switching power supply circuit according to claim 2, wherein said slave insulated gate bipolar transistor is brought into conduction subject to satisfaction of both said condition, and a second condition that is satisfied if a current flowing in said slave reactor becomes zero.

6. The switching power supply circuit according to claim 1, further comprising a capacitor having a capacitance of 0.5 μF or higher than 0.5 μF, the capacitor having one end connected to said low potential line, and the other end connected to said master power supply line on the side opposite said first master diode with respect to said master reactor, the other end also being connected to said slave power supply line on the side opposite said first slave diode with respect to said slave reactor.

7. The switching power supply circuit according to claim 6, wherein said slave insulated gate bipolar transistor is brought into conduction subject to satisfaction of both said condition, and a second condition that is satisfied if a current flowing in said slave reactor becomes zero.

8. The switching power supply circuit according to claim 1, wherein said slave insulated gate bipolar transistor is brought into conduction subject to satisfaction of both said condition, and a second condition that is satisfied if a current flowing in said slave reactor becomes zero.

9. The switching power supply circuit according to claim 1, wherein a diode is not connected in parallel with said master insulated gate bipolar transistor.

\* \* \* \* \*